United States Patent
Epshteyn

(10) Patent No.: US 7,455,232 B2
(45) Date of Patent: Nov. 25, 2008

(54) SYSTEMS AND METHODS FOR DATAFORM DECODING

(75) Inventor: Alan J. Epshteyn, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 424 days.

(21) Appl. No.: 11/095,837

(22) Filed: Mar. 31, 2005

(65) Prior Publication Data

US 2006/0219789 A1 Oct. 5, 2006

(51) Int. Cl.
*G06K 7/10* (2006.01)

(52) U.S. Cl. .................. 235/462.11; 235/462.46; 235/462.01; 705/26; 348/207.1

(58) Field of Classification Search ............ 235/462.11, 235/462.46, 462.01; 705/26; 348/207.1
See application file for complete search history.

(56) References Cited

U.S. PATENT DOCUMENTS

| | | | |
|---|---|---|---|
| 5,485,603 A * | 1/1996 | Nijholt et al. ............... 713/600 |
| 6,766,955 B2 | 7/2004 | Patel et al. |
| 7,118,040 B2 * | 10/2006 | Melick et al. .......... 235/462.01 |
| 2002/0084330 A1 * | 7/2002 | Chiu ..................... 235/462.11 |
| 2003/0113031 A1 * | 6/2003 | Wal ............................ 382/260 |
| 2005/0011957 A1 | 1/2005 | Attia et al. |
| 2005/0041935 A1 | 2/2005 | Liu et al. |
| 2005/0277872 A1 * | 12/2005 | Colby et al. .................. 604/67 |
| 2006/0055781 A1 * | 3/2006 | Yi et al. .................... 348/207.1 |
| 2006/0114993 A1 * | 6/2006 | Xiong et al. ........... 375/240.11 |
| 2006/0173747 A1 * | 8/2006 | Gantman et al. .............. 705/26 |
| 2007/0063050 A1 * | 3/2007 | Attia et al. ............. 235/462.46 |

* cited by examiner

*Primary Examiner*—Michael G. Lee
*Assistant Examiner*—Allyson N Trail
(74) *Attorney, Agent, or Firm*—Fay Kaplun & Marcin, LLP

(57) ABSTRACT

Methods and apparatus for decoding dataforms comprising integrating a dataform decoding module into a video processing system. In an embodiment of the invention, video data is analyzed for dataforms as it is being prepared for display on a mobile computer screen. Packaging a dataform decoding algorithm as a video display module allows many hardware devices to easily add dataform decoding capabilities.

27 Claims, 5 Drawing Sheets

SYSTEMS AND METHODS FOR DATAFORM DECODING

FIELD OF THE INVENTION

The invention is directed to dataform decoding and, more particularly to systems and method for analyzing dataforms in video data.

BACKGROUND OF THE INVENTION

Computing devices such as personal digital assistants (PDAs), cell phones, laptops, terminals etc. often include cameras for capturing video data and/or images. Additionally, these devices can also comprise a screen for displaying the captured data. Thus, the camera on these computing devices can be used to capture and decode dataforms. Capturing and decoding dataforms in video data is described in U.S. Pat. No. 6,766,955, assigned to Symbol Technologies, Inc.

Dataforms are any indicia that encode numeric and other information in visual form. For example, dataforms can be barcodes, two dimensional codes, marks on an object, labels, signatures, signs etc. Barcodes are comprised of a series of light and dark rectangular areas of different widths. The light and dark areas can be arranged to represent the numbers of a Universal Product Code (UPC). Direct Part Marked (DPM) dataforms are, for example, two dimensional data matrixes etched into the surface of a product. Additionally, dataforms are not limited to products. They can be used to identify important objects, places, etc. Dataforms can also be other objects such as a trademarked image, a person's face, etc.

Adding dataform decoding capabilities to a computing device can expand the functions of a handheld device, thus allowing the device to become an enterprise mobility terminal, a personal scanner, etc.

Accordingly, there is a desire for systems and methods for adding dataform decoding capabilities to existing and future computing devices.

SUMMARY OF THE INVENTION

The invention as described and claimed herein satisfies this and other needs, which will be apparent from the teachings herein.

The present invention provides systems and method for dataform processing. In an embodiment of the invention a dataform is decoded as part of a video processing system. Video data is prepared for display using a scalable video processing system. The video processing system comprises a plurality of individual video processing modules that perform different steps in the preparation process.

At least one of the video processing modules of the system can be implemented as a dataform processing module. Therefore, dataforms captured in the video data are decoded as the video data is prepared for display. Integrating a dataform decoding algorithm into a video processing system allows any device that can display video using the system to become a scanner and thereby add all the functionality that comes with a scanning feature.

For example a computing device, such as a smart phone, enabled with dataform decoding capabilities can obtain additional information related to a decoded dataform, such as for example, inventory information and/or competitor price information.

In an embodiment of the invention, some or all of the video processing modules can be applied in parallel, in series or in a combination of parallel and series processing.

Dataform decoding and video processing may be too time consuming and/or processor intensive for some computing devices. Or dataform decoding may use too much battery power in a handheld device. Thus, the dataform decoding module can be programmed to decode every other frame of video data, or only decode in response to a signal from a device operator or some other source.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

Figure 1:
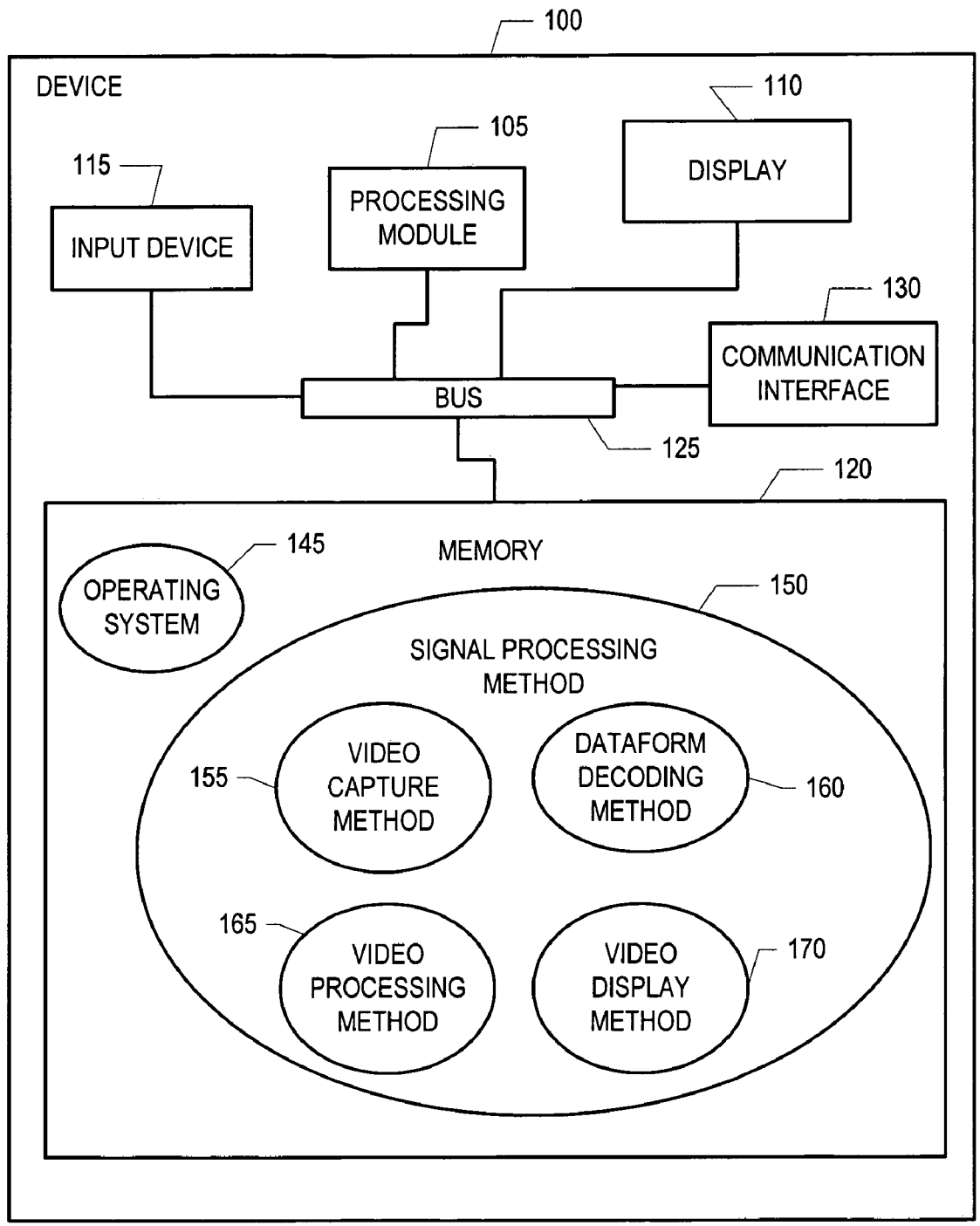
FIG. 1 illustrates a block diagram of an exemplary device implemented in accordance with an embodiment of the invention.

There will now be shown and described in connection with the attached drawing figures several exemplary embodiments of systems and methods for decoding dataforms.

Many computing devices have the functionality to capture and display video data. One method of video processing comprises sending video data through a video processing pipeline, comprised of one or more modules that perform one or more steps of a media capture/playback process. Exemplary video processing steps include video capturing, color processing, scaling, compression, rendering, etc.

An exemplary module based media processing architecture is Microsoft® DirectShow®. In DirectShow® the modules are called filters. In an exemplary operation of Direct-Show® a video stream can enter a video processing pipeline through a capture filter. Then, the captured video data is processed by one or more transform filters, and finally, the video data is displayed by a rendering filter.

An exemplary embodiment of the invention provides dataform decoding, of dataforms in video data, by developing a video processing module, such as, for example, a Direct-Show® filter, that can decode dataforms. The dataform decoding module can be based on any known dataform decoding algorithm, or any decoding algorithm developed in the future. In an exemplary embodiment of the invention, video data entering a video processing pipeline through a capture module, is sent through a dataform decoding module before it is sent to a rendering filter for display. If captured video data comprises an image of a dataform, the dataform is decoded by the dataform decoding module and passed to a rendering module. The information passed to the rendering module can be a text file comprising the information included in the dataform.

A dataform decoding module can be integrated into a video capture/playback process in a plurality of ways. For example, captured video data can be analyzed in series or in parallel. More specifically, an exemplary video processing pipeline can comprise a capture module, a dataform decoding module, a video scaling module, and a rendering module. In an embodiment of the invention, captured video data is processed by the dataform decoding module before it is sent to the scaling module. In other embodiments, the scaling module and the dataform decoding module are performed at the same time.

Providing dataform decoding as a module of a video processing architecture allows a device to offer decoding capabilities without requiring proprietary hardware. In other words, the dataform decoding module is hardware independent. For example, in one embodiment, where the video processing architecture is implemented as DirectShow®, any computing device that has a camera and runs Windows® or Windows® CE or any other Microsoft® operating system can be easily modified to support dataform capture and decode. For example, a decoding filter can plug into the DirectShow architecture used by a device. Adding dataform decoding to handheld devices can be useful in providing numerous enterprise and consumer services and solutions.

In one exemplary embodiment, an internet content provider can offer a decoding filter as an upgrade to a computing device, such as, for example, a Smartphone. Owners of a Smartphone can go the website, download the decoding filter and thereby convert their computing device into a scanner. The Internet site can offer barcode decoders, PDF417 decoders, DPM decoders, all purpose decoders, etc.

Since the dataform decoding module adds additional processing, the performance of the video capture/playback process of a computing device can be affected. In addition, the additional processing can use additional battery power. Thus, the performance of the device can be adjusted by not processing every frame. For example, the dataform decoding module can be programmed to decode every other frame of video data, or to decode in response to a decode signal initiated by a user. The performance of the device can also be adjusted by the complexity of the dataform decoding algorithm used. For example, a more powerful decoding algorithm may be able to decode a wider range of dataforms, but it may take longer to processes. An appropriately powerful decoding algorithm can be chosen to meet a desired device performance. The strength of the computing device's processing unit and the image capture resolution, among other things, can also affect the performance of the computing device.

FIG. 1 illustrates an exemplary block diagram of a device 100 implemented in accordance with an embodiment of the invention. The device 100 comprises a processing module 105, a display 110, an input device 115, a communication interface 130 and memory 120 coupled together by bus 125. The modules 105, 110, 115, 130, 120, 125 of device 100 can be implemented as any combination of software, hardware, hardware emulating software, reprogrammable hardware, etc. The bus 125 is an exemplary bus showing the interoperability of the different modules of the invention. As a matter of design choice there may be more than one bus and in some embodiments certain modules may be directly coupled instead of coupled to a bus 125. The device 100 can be, for example, a handheld computer, a PDA, a terminal, a laptop, a smart phone, etc.

Processing module 105 can be implemented as, in exemplary embodiments, one or more Central Processing Units (CPU), Field-Programmable Gate Arrays (FPGA), etc. In an embodiment, the processing unit 105 may comprise a plurality of processing units or modules. Each module can comprise memory that can be preprogrammed to perform specific functions, such as, for example, signal processing, interface emulation, etc. In other embodiments, the processing unit 105 can comprise a general purpose CPU. Processing unit 105 can also comprise any combination of the processors described above.

Memory 120 can be implemented as any combination of volatile memory, non-volatile memory and rewriteable memory, such as, for example, Random Access Memory (RAM), Read Only Memory (ROM) and/or flash memory. The memory 120 stores methods and processes used to operate the device 100, such as, for example, operating system 145 and signal processing method 150. The memory 120 can comprise random access type memory, read-only type memory and rewritable memory. In some embodiments, the device 100 can be a proprietary decoding device and an operating system 145 may not be necessary.

In embodiments of the invention, input device 115 can comprise one or more types of input devices 115. For example, when device 100 is implemented as a handheld scanner, the device 100 can comprise a video camera for capturing video data. Additionally, the scanner can comprise a trigger, which is pressed by a scanner operator, when the operator wants to scan a dataform. In other embodiments, the device 100 can comprise a keypad, a touch screen, a microphone, etc.

The device 100 can use the display 110 to playback video data. The device 100 can play back video currently being captured by a camera, and/or the device 100 can play back video obtained at an earlier time and stored in memory 120. The stored video may be captured by the device 100, at an earlier time and/or transferred to the device 100 through communication interface 130. The display can be, in different embodiments of the invention, a liquid crystal display, a projection display, etc. The display can also be external to the device 100, such as, for example, a computer monitor.

Communication interface 130 is used by the device 100 to communicate with other devices. For example, the communication device can be an antenna that the device 100 uses to wirelessly communicate to another computer through a network. The networked computer can comprise additional information related to the dataform decoded by the device 100. The additional information can comprise, inventory information, pricing information, etc.

Returning to memory 120, signal processing method 150 comprises a video capture method 155, a dataform decoding method 160, a video processing method 165 and a video display method 170. In an embodiment of the invention, the signal processing method can be implemented as Direct-Show®, and the methods 155, 160, 165, 170 are filters. In an exemplary signal processing method 150, video capture method 155 uses input device 115 to capture video data. Then, the video data is sent to dataform decoding method 160 and video processing method 165. Dataform decoding method 160, applies a dataform decoding algorithm, for example, an imager decoding algorithm, and sends any decoded information to the video display method 170.

Video processing method 165 can be implemented as one or more video processing methods. For example, the video processing method 165 can comprise a scaling method, a compression method, a color conversion method, etc. Each of these video processing methods can be implemented as separate modules. Captured video data is processed using video processing method 165 and is sent to the video display method 170.

Video display method 170 receives data from the dataform decoding method 160 and the video processing method 165, and displays the data on the device's 100 display 110. The displayed information can be the video data being captured by the device with the decoded dataform information overlaid or displayed adjacent to the video.

The exemplary embodiment of FIG. 1 illustrates video capture method 155, dataform decoding method 160, video processing method 165 and video display method 170 as separate components enclosed by signal processing method 150, but those methods are not limited to this configuration. Each method described herein in whole or in part can be separate components or can interoperate and share operations. Additionally, although the methods are depicted in the memory 120, in alternate embodiments the methods can be incorporated permanently or dynamically in the memory of processing unit 105. Further, in alternate embodiments, the methods may be stored at a remote location and accessed by the device 100 through communication interface 130.

Memory 120 is illustrated as a single module in FIG. 1, but in some embodiments image scanner 100 can comprise more than one memory module. For example, the methods described above can be stored in separate memory modules. Additionally, some or all parts of memory 120 may be integrated as part of processing module 105.

Figure 2:
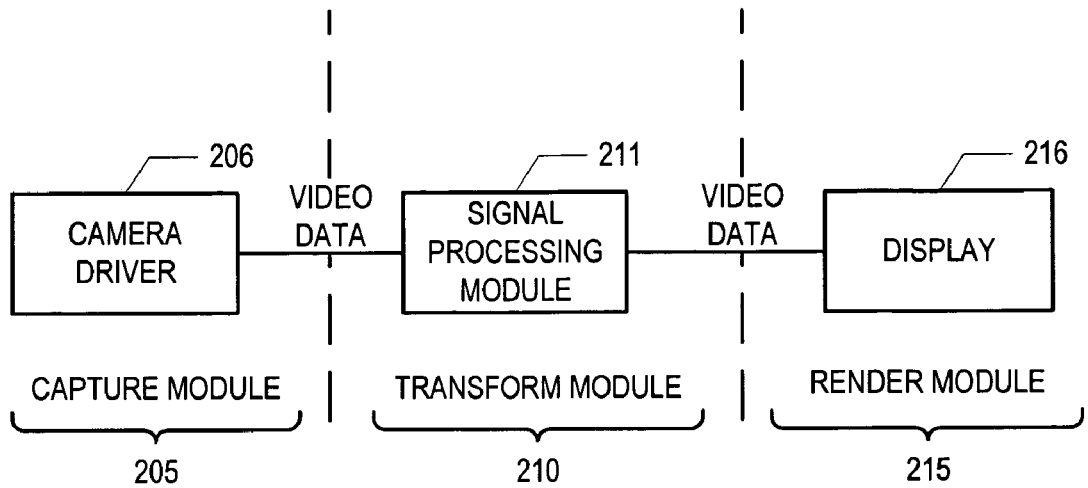
FIG. 2 illustrates an exemplary video processing pipeline implemented in accordance with an embodiment of the invention.

FIG. 2 illustrates an exemplary video capture/playback pipeline 200 implemented in accordance with an embodiment of the invention. The capture module 205 comprises a camera driver 206, which captures video data. The video data is then sent to a transform module 210. Transform module 210 comprises a signal processing module 211. The signal processing module 211 can comprise a plurality of individual video processing modules, such as, for example, a color conversion module, a scaling module, a special effects module, a dataform decoding module, etc.

After the transform module 210, processes the video data, it is sent to a render module 215. Render module 215 comprises a display module 216, which displays the processed video on a device 100. The displayed information can comprise a real time stream of the video being captured by a device operator, with any decoded dataform information also displayed on the same screen.

Having a real time video display of what a device 100 is trying to decode has many advantages. For example, in DPM decoding, a device 100 illuminates a DPM dataform and analyzes light returning from the dataform to decode the dataform. The angle of the decoder and/or the light source with respect to the DPM dataform is important when decoding a DPM dataform because, the returning light is clearer at different angles. Thus, a real time video display allows a user to turn a DPM decoder to search for a good angle to decode a dataform. Additionally, since the decoding algorithm is integrated into the video capture/playback process, once the device operator has found an adequate angle, the dataform is decoded.

Figure 3:
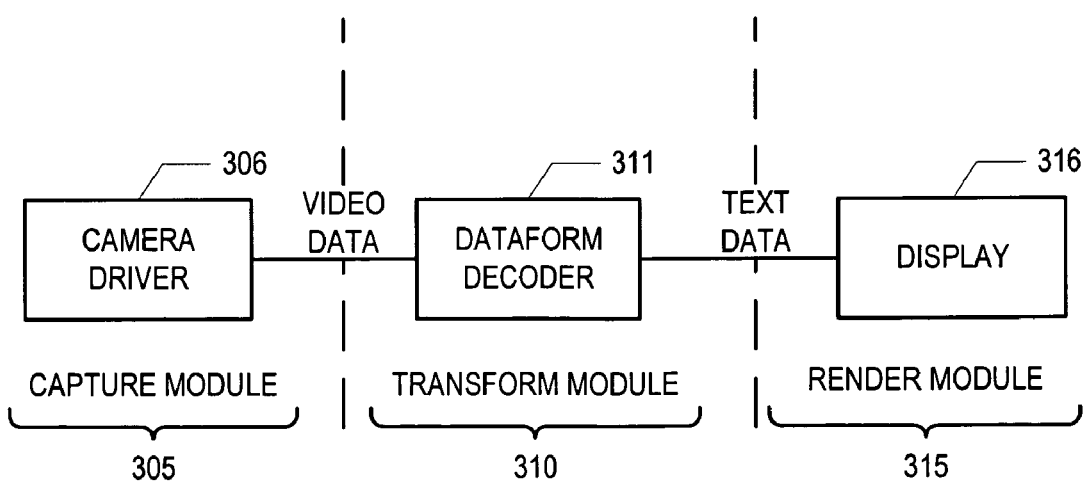
FIG. 3 illustrates an exemplary video processing pipeline implemented in accordance with an alternate embodiment of the invention.

FIG. 3 illustrates an exemplary video processing pipeline 300 for a proprietary decoder. In an exemplary operation of the pipeline 300, a device 100 captures video data using a camera driver 306 in capture module 305. The captured video data is sent to a dataform decoder 311 in transform module 310. The dataform decoder analyzes the images taken by the camera and decodes any dataforms in the video data. The dataform decoder 311 sends the decoded dataform information to a display module 316 of a render module 315 for display. The decoded information can be text comprising, for example, the UPC encoded as a barcode. The dataform information can be displayed on a device 100, or in alternate embodiment the device can send the display data to an externally coupled display device, such as, for example, a monitor, a Point of Sale (POS) terminal, etc.

Dataform decoding algorithms have many levels of sophistication. For example, a highly sophisticated algorithm can decode two dimensional codes, truncated codes, damaged codes, low contrast codes, DPM code, etc., but this algorithm can be processor intensive and time intensive. Other dataform decoding algorithms are quick and do not require much processing power, but they can only decode one or few dataform types, such as, for example, one dimensional barcodes.

When displaying video data, a device may not have the time or the processing power to efficiently display video data and decode every type of dataform in the video data. Thus, the sophistication of the dataform decoding algorithm used in a dataform decoding module can be chosen to fit the specifications and/or the requirements of the device 100. Adjustments to video quality, such as, for example, lowering frame rates and/or resolution can also be made to accommodate for time and/or processing needs.

Additionally, in some embodiments of the invention, a device 100 can selectively analyze images in video data instead analyzing every captured image. For example, a dataform decoding module can be programmed to pass through every other frame of video. Alternatively and/or additionally, a dataform decoding module can be modified to pass through images until it receives an instruction to start decoding. In an embodiment of the invention, the instruction can come from a trigger pressed by a device operator. In other embodiments, the device 100 can be modified to operate in one or more modes, such as for example, a video capture mode and a decode mode. These technique can save processor time and battery power.

Figure 4:
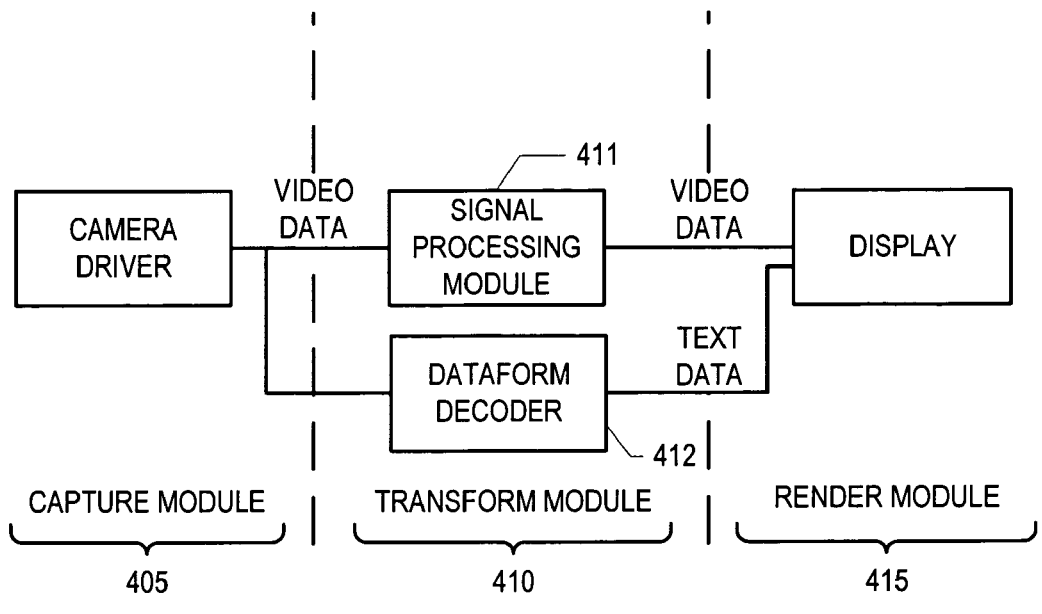
FIG. 4 illustrates an exemplary video processing pipeline comprising parallel video processing implemented in accordance with an embodiment of the invention.

In embodiments of the invention, the different modules that make up a signal processing suite can be performed in series or parallel. FIG. 4 illustrates a parallel implementation of a video capture/playback pipeline 400. Video data captured by the capture module 405, is sent in parallel to the transform modules 410. One transform module 410 is a signal processing module 411, which can be in alternate embodiments, a plurality of modules that process video data for display. The processed video data is outputted from the signal processing module 411 and sent to a render module 415. Another transform module 410 is a dataform decoder 412, which decodes dataforms in the video data. Text representing the decoded information is sent to a render module 415. The render module 415, receives the video data and the text data and renders the data for display.

Figure 5:
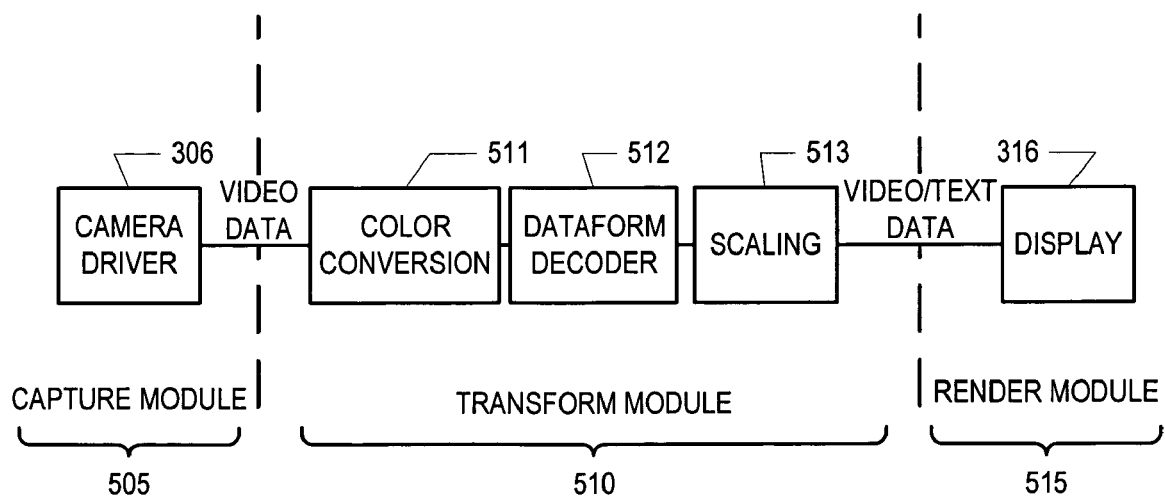
FIG. 5 illustrates an exemplary video processing pipeline comprising series video processing implemented in accordance with an embodiment of the invention.

FIG. 5 illustrates a series implementation of a video capture/playback pipeline 500. Video data captured by the capture module 505, is sent to a transform module 510, for example, a color conversion module 511. The color conversion module 511 can, for example, balance the color of the captured video data, convert the color resolution to match the resolution of a device 100, etc. Once the color of the video data is processed, the video data is sent to a dataform decoder 512. The dataform decoder 512 can analyze the video data and decode any dataform that may be captured in the video data. The dataform decoder 512 can then embed the decoded dataform into the video data. In alternate embodiments the video data and the decode dataform information can be combined using a separate embedding module (not shown).

Following the decoding step, the video data is sent to a scaling module 513. The scaling module 513, scales the video data to an appropriate size, such as, for example full screen, half screen, etc. After scaling, the render module 515, receives the video data and renders the data for display.

In alternate embodiments, the video capture/playback pipeline can be a combination of series and parallel. Additionally, certain signal processing modules can be used more than once. In an alternate embodiment of the pipeline 500 illustrated in FIG. 5, the video data can leave the color conversion module 511 and go the dataform decoder 512 and the scaling module 513, in parallel. The output from the dataform decoder 512 and the scaling module 513 can be combined by another transform module, or by the render module 515. This series/parallel configuration may be preferable if a transform module, such as, for example, a color conversion module, is beneficial to two other transform modules that can be performed in parallel.

Figure 6:
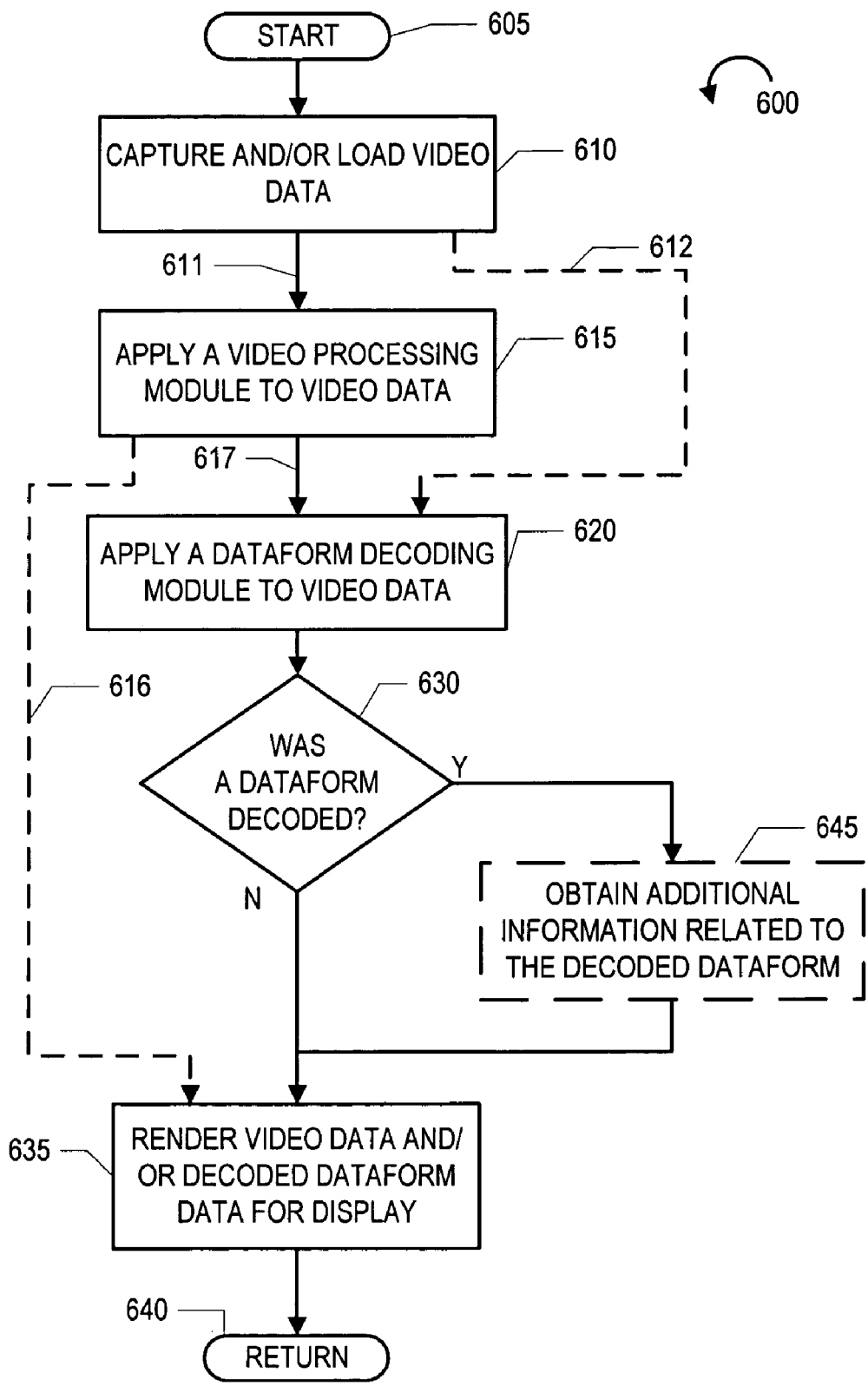
FIG. 6 illustrates an exemplary dataform decoding method implemented in accordance with an embodiment of the invention.

FIG. 6 illustrates an exemplary embodiment of a method 600 for signal processing, such as, for example, decoding dataforms. The steps of method 600 and other methods described herein are exemplary and the order of the steps may be rearranged. Signal processing method 600 begins in start step 605. In an exemplary embodiment, the method 600 begins when a device 100 is powered on, or a dataform decoding program is executed. Additionally, the method 600 may also be initiated by a command from another program running on the device 100.

Processing proceeds from step 605 to step 610, where video data is captured by a device 100. In an alternate embodiment, the device 100 may load video data that was captured earlier or transferred onto the device 100. Following step 610, processing proceeds to step 615, where the device 100 applies a video processing module to the video data. As mentioned earlier, this video processing module can be a plurality of individual modules, such as, for example, a color conversion module, a scaling module, a special effects module, etc. Video data can go though the video processing modules in parallel steps, in series steps, or in parallel/series steps. Therefore, although not shown, step 615 can, in alternate embodiments, comprise of a plurality of steps for processing video data.

Following step 615, processing proceeds to step 620, where the device 100 applies a dataform decoding module to the captured video data. Then, in step 630, if a dataform is not decoded, processing proceeds to step 635, where the video data is passed to a render module and is played back on the display of the device 100. The method 600 returns in step 640 to capture and analyze additional video data.

Returning to step 630, if a dataform is decoded, processing proceeds from step 630 to optional step 645. In step 645, the device obtains additional information related to the decoded dataform for display to a device 100 operator. For example, a stock clerk can use an enterprise mobility device to scan products on a shelf and determine if additional inventory must be ordered. The device 100 can use its communication interface 130 to send a decoded dataform to an inventory management computer over a network. The computer can read the decoded dataform and determine inventory numbers and return that information to the device 100. The dataform information and the inventory information are sent to a render module for display on the device.

In an alternate embodiment, the dataform information and the video data can be combined by another transform module (not shown) before being sent to a render module. Following step 645, processing proceeds to step 635, where the video data is rendered on the device. Then, the method 600 returns in step 640 to capture and analyze additional video data. When optional step 645 is not performed, processing proceeds from step 630 to step 635, where the video data is displayed.

In an alternate embodiment, video processing and dataform decoding can be performed in parallel. Therefore, returning to step 610, in an alternate embodiment, video processing step 615 and dataform decoding step 620 are implemented in parallel as depicted by the solid arrow 611 and the dotted arrow 612. After the video data is modified in step 615, processing proceeds to step 635, as depicted by doted arrow 616, instead of proceeding to step 620 as depicted by solid arrow 617. In step 635, the device 100 waits for dataform information before rendering the video data. Or if dataform information is already waiting, the device 100 displays the video data and the dataform information. The dataform information is determined from the video data in parallel with the video processing. Returning to step 610, processing proceeds from step 610 to step 620, as depicted by dotted arrow 612. Then processing proceeds from step 620 to step 630, then optionally to step 645 and then to step 635, as described above.

Figure 7:
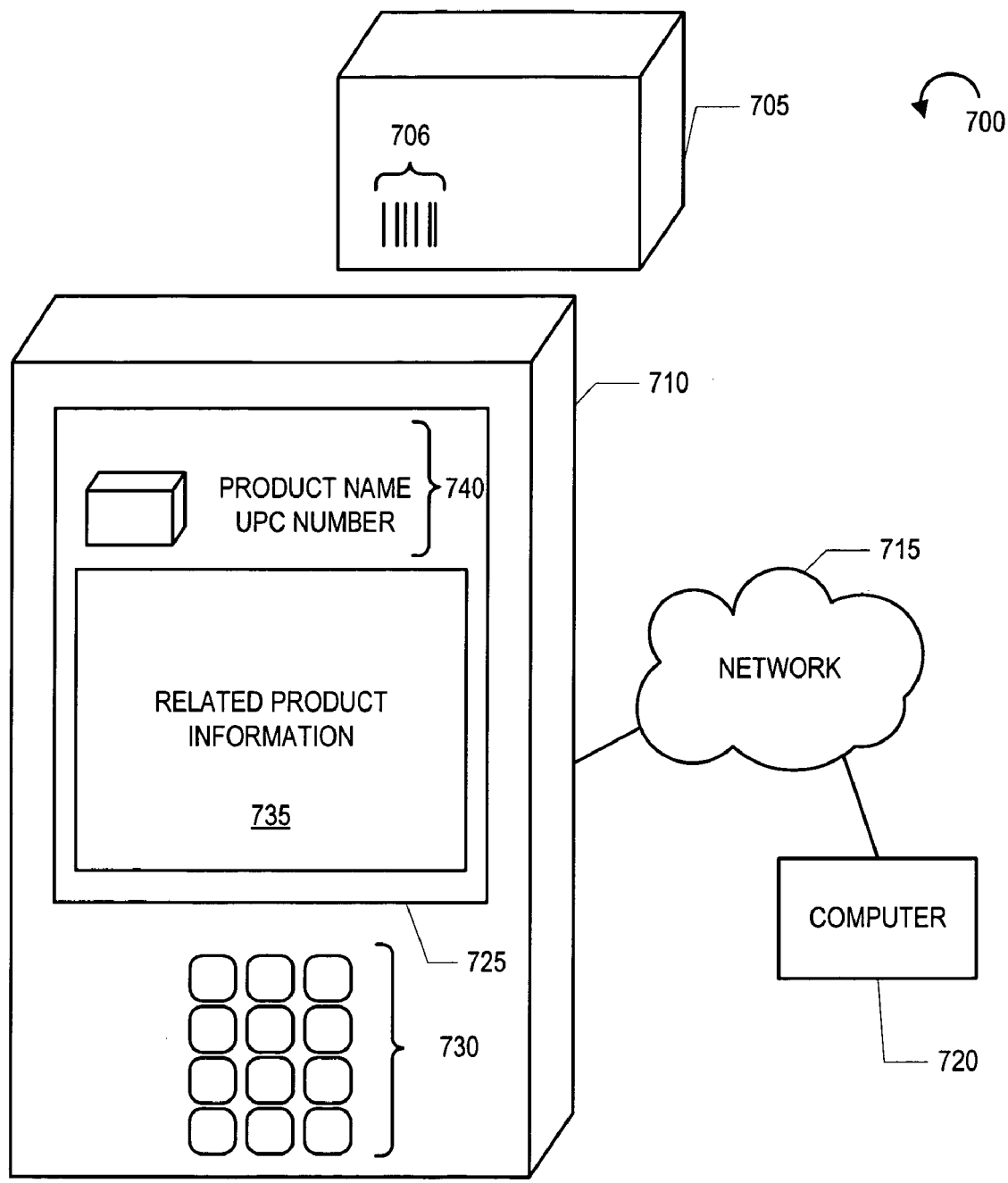
FIG. 7 illustrates an exemplary system implemented in accordance with an embodiment of the invention.

FIG. 7 illustrates an exemplary system 700 implemented in accordance with an embodiment of the invention. System 700 comprises an object 705 comprising a dataform 706 and a computing device 710 and a computer 720 coupled to a network 715. The device 710 and the computer 720 can be coupled the network 715 wirelessly or through a wire. The network can be the Internet, a private data network, or a combination of the two. In an alternative embodiment, the device 710 and the computer 720 can be directly coupled. Still, in other embodiments, the system 700 does not include a computer 720 or a network 715.

The computing device 710 comprises a camera (not shown), a display 725, and a keypad 730. The device 710 can be implemented in exemplary embodiments as a smartphone, an enterprise mobility terminal, etc. In the exemplary embodiment illustrated in FIG. 7, the display 725 comprises a title area 740, including a small image of a decoded product 705 in the upper left hand corner of the display, and a product name and its UPC number displayed to the right of the image.

Below the title area 740 is another area 735 for displaying additional information related to the product. This additional information can be, in alternate embodiments, the video stream being captured by device 710, inventory information, pricing information, comparable product information, etc. The additional information, the small image and the product name can be obtained by the device 710 from computer 720, through network 715. Alternatively, the product name can be obtained from a sophisticated dataform, and the image can be taken from the video data. In one exemplary implementation, the device 710 can be implemented as a smart phone, and a consumer can use their phone to capture videos of products and automatically retrieve competitor's prices through the Internet.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed:

1. A device, comprising:
a processor;
an input device in communication with the processor;
a display; and
a memory storing:
   a video capture module capturing video data using the input device,
   a dataform decoder module decoding a dataform in the video data, wherein the dataform decoder module decodes only every other frame of the video data,
   a video processing module processing the video data, and
   a video display module displaying the video data on the display.

2. The device of claim 1, wherein the video processing module and the dataform decoder module operate serially with respect to each other.

3. The device of claim 1, wherein the video processing module and the dataform decoding module operate in parallel with each other.

4. The device of claim 1, wherein the video processing module includes a scaling module, a compression module, and a color conversion module.

5. The device of claim 1, wherein the input device includes a video camera in communication with the video capture module.

6. The device of claim 1, wherein the dataform decoder module:
analyzes an image from the video capture module, and
decodes the dataform included in the image.

7. The device of claim 1, wherein the dataform includes one of a barcode, a two-dimensional code, a label, and a signature.

8. The device of claim 1, wherein the dataform includes one of a Uniform Product Code (UPC) and a Direct Part Marked (DPM) code.

9. The device of claim 6, wherein the dataform decoder module sends the decoded dataform to the video display module.

10. The device of claim 6, wherein the dataform decoder module embeds the decoded dataform in the video data.

11. The device of claim 6, wherein the decoded dataform is embodied as text.

12. The device of claim 6, wherein the text representing the decoded dataform is supplied to the video processing module.

13. The device of claim 1, further comprising:
a communication interface having an input through which the dataform decoder module is downloaded from an external source into the memory.

14. The device of claim 1, further comprising:
a communication interface for transmitting the decoded dataform to a remote device.

15. The device of claim 1, wherein the remote device is an inventory management system.

16. A method, comprising:
capturing an image, the imaging including video data;
decoding a dataform included in the video data, wherein the decoding step is performed on only every other frame of the video data; and
combining the decoded dataform with the video data.

17. The method of claim 16, further comprising:
displaying the video data combined with the decoded dataform.

18. The method of claim 16, further comprising:
transmitting the decoded dataform to a remote device.

19. The method of claim 18, wherein the remote device is an inventory management system.

20. The method of claim 16, wherein the dataform includes one of a barcode, a two-dimensional code, a label, and a signature.

21. The method of claim 16, wherein the dataform includes one of a Uniform Product Code (UPC) and a Direct Part Marked (DPM) code.

22. The method of claim 16, further comprising:
performing a video processing algorithm on the video data.

23. The method of claim 22, wherein the video processing algorithm and the decoding of the dataform are performed serially with respect to each other.

24. The method of claim 22, wherein the video processing algorithm and the decoding of the dataform are performed in parallel to each other.

25. A device, comprising:
an input device obtaining video data;
a display; and
a memory arrangement storing:
   a dataform decoder module decoding a dataform in the video data, the dataform decoder module decoding only every other frame of the video data
   a video processing module processing the video data, and
   a video display module displaying the video data on the display.

26. The device of claim 25, wherein the input device loads the video data from a storage device.

27. The device of claim 25, wherein the input device includes a camera capturing the video data.

* * * * *